United States Patent [19]
Hunter

[11] 3,776,701
[45] Dec. 4, 1973

[54] CATALYST SUPPORTING STRUCTURE

[75] Inventor: James B. Hunter, Newtown Square, Pa.

[73] Assignee: Matthey Bishop Inc., Malvern, Pa.

[22] Filed: Oct. 5, 1971

[21] Appl. No.: 186,630

[52] U.S. Cl.................. 23/288 R, 55/526, 423/392
[51] Int. Cl.............................. B01j 1/00, B01j 9/04
[58] Field of Search.................. 23/288 R; 423/392; 55/526

[56] References Cited
UNITED STATES PATENTS

| | | | |
|---|---|---|---|
| 2,829,733 | 4/1958 | Bartels et al........................... | 55/526 |
| 3,245,206 | 4/1966 | Bonnet................................. | 55/158 |
| 3,434,826 | 3/1969 | Holzmann.................. | 23/288 R UX |

OTHER PUBLICATIONS

"Nitric Acid Rolls On," Chemical Engineering; Vol. 77, June 29, 1970; McGraw-Hill, N.Y., N.Y., (page 24 relied on).

Primary Examiner—Barry S. Richman
Attorney—Cushman, Darby and Cushman

[57] ABSTRACT

A catalyst supporting structure comprising a layer of heat-resistant rope elements composed of compacted knitted wire, placed in contiguous relationship with each other to provide a pad of substantially uniform thickness and having flat top and bottom surfaces and a woven sheet of heat-resistant material bonded to each surface.

9 Claims, 11 Drawing Figures

PATENTED DEC 4 1973 3,776,701

INVENTOR
JAMES B. HUNTER

BY Cushman, Darby & Cushman
ATTORNEYS

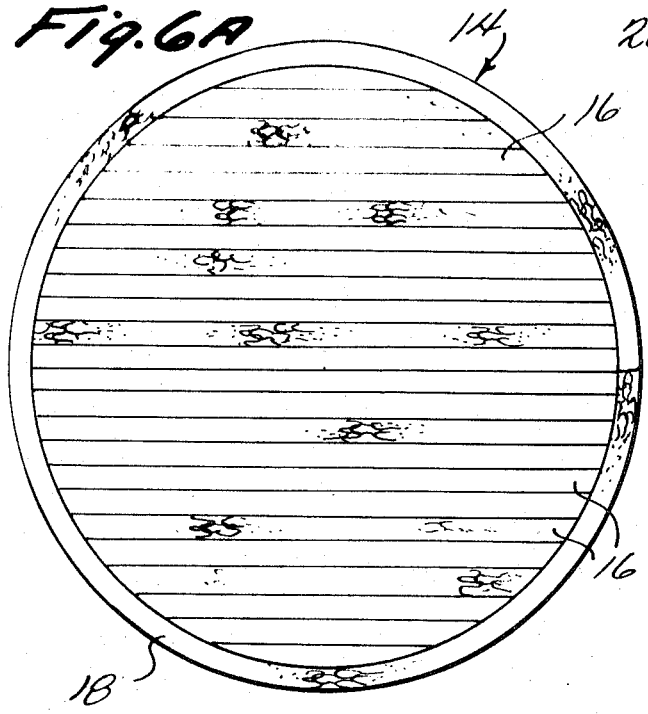
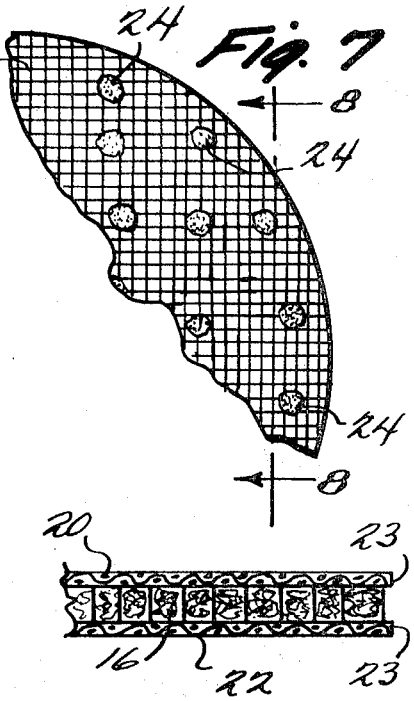
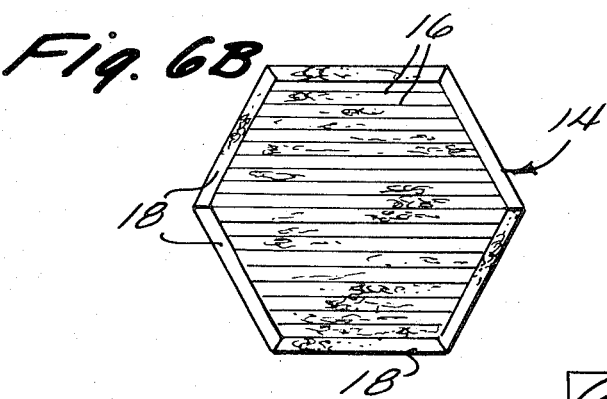
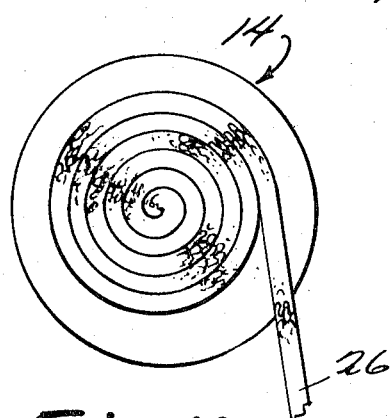
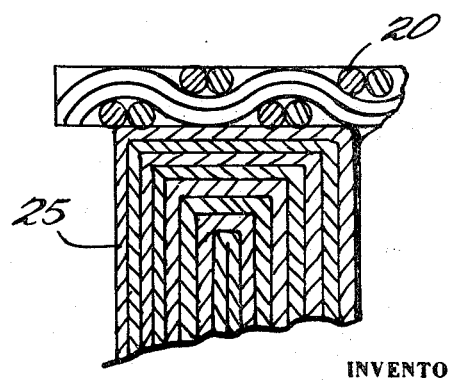
INVENTOR
JAMES B. HUNTER
BY Cushman, Darby & Cushman
ATTORNEYS

CATALYST SUPPORTING STRUCTURE

The present invention relates to a catalyst supporting structure and to a process for making the same.

In numerous types of chemical processes involving a catalyzed reaction of gaseous reactants, it is desirable to support the catalyst by means which will permit gaseous reactants to pass through the catalyst and its support at elevated temperatures and pressures. For example, in the oxidation of ammonia in the preparation of nitric acid, ammonia and oxygen are passed through a platinum gauze catalyst supported on nichrome bars and heavy mesh screen (see, for example, U.S. Pat. No. 3,195,988). It has also been proposed to position getter netting or gauze between the catalyst and the support to recover platinum lost by volatilization from the platinum catalyst (see U.S. Pat. No. 3,434,826 which describes the use of one or more nettings or screens of palladium or palladium/gold alloy between platinum wire screens constituting the catalyst and a coarse metal netting as support for the catalyst and getter).

It has recently been proposed that the catalyst support for ammonia oxidation might comprise an inert packaging (Chemical Engineering, June 29, 1970, page 24), the overall catalyst system being composed of three layers: the platinum catalyst gauze (preferably platinum/rhodium alloy), an intermediate getter layer of palladium or palladium/gold alloy to recover vaporized platinum metal; and a support pad of nichrome wire or equivalent. An alleged advantage of this arrangement is that it permits the use of less platinum catalyst.

The principal object of the present invention is to provide a novel form of catalyst supporting structure which is particularly suitable for use in the catalytic oxidation of ammonia or the like.

Another object is the provision of an improved method for making a catalyst supporting structures of the type indicated. Other objects will also be hereinafter apparent.

Broadly described, the supporting structure of this invention comprises a layer of heat-resistant rope or rope elements composed of compacted knitted wire and positioned so that adjacent elements are in contiguous relationship with each other to provide a pad of substantially uniform thickness throughout and having flat top and bottom surfaces, and a woven sheet of heat-resistant material bonded to each flat surface of the pad. The heat-resistant material used for the rope elements preferably comprises nichrome wire although other types of metal wire, e.g., stainless steel, or the like, may be used provided the wire is capable of being fabricated as required herein and can withstand the required handling and operating conditions. The wire utilized usually will have a diameter in the range of 0.005 to 0.009 inches, preferably about 0.006 to 0.008 inches, although diameter sizes outside this range may also be used.

Conventionally available woven nichrome screens, usually circular in shape but not necessarily so, may be used as the sheets bonded to the pad of the present supporting structure. Typically these sheets may be nichrome screens or gauzes of 50 mesh or coarser (U.S. Sieve). Particularly useful results have been obtained with 10–20 mesh woven nichrome gauze (e.g. 18 mesh, 0.016 inch diameter wire). Other types of metal screens, e.g., those made of stainless steel, or the like, may also be used, provided they are capable of withstanding the operating conditions to which they are to be subjected.

The wire rope used herein represents a particularly important feature of this invention. As indicated above, the rope comprises knitted wire tubing flattened, rolled and compacted to form a square or rectangular cross-section, preferably square. It is essential for best results that the outer surfaces of the rope be substantially flat so that when segments of the rope are arranged in contiguous relationship a pad having a substantially uniform thickness is formed. Typically the rope is such that it has cross-sectional dimensions in the range of one-eighth inch to one-half inch with a square cross-section of ¼ inch × ¼ inch preferred although it will be appreciated that the cross-sectional dimensions may be varied.

The wire rope referred to above may be formed into a pad for use herein in several ways, e.g., by cutting the rope into rope elements of desired length and bringing these into parallel contiguous relationship or by simply winding the rope into a flat spiral so that adjacent elements thereof are in contiguous relationship. Both of these methods start with a knitted tube of nichrome or other head resistant wire. Tubes of this sort are known in the art (see, for example, U.S. Pat. No. 3,245,206). According to the present invention, the knitted tube is flattened, rolled into a cylindrical form and then shaped into a porous flexible flat-sided rope, preferably of relatively square cross-section. In one embodiment of the invention, the rope is cut into rope elements of appropriate length and these are placed side by side in parallel contacting relationship in a common plane to form the pad. The pad is completed by wrapping another flat sided rope element around the circumference or outer extremity defined by the parallel rope elements. The supporting structure is completed by placing woven sheets on the top and bottom surfaces of the resulting pad and bonding, e.g., spot welding, these woven sheets to the rope elements at spaced intervals over the entire surface of the pad.

In the alternative fabricating method, the rope is not cut into rope elements but instead is simply wound in a spiral to give a circular pad of desired diameter followed by positioning the woven outer screens on the top and bottom of the pad and spot welding or otherwise bonding the sheets to the pad.

The invention is hereinafter described in more detail by reference to the accompanying drawings wherein:

FIG. 1 is a vertical sectional view of a catalytic reactor showing the manner in which a catalyst supporting structure according to this invention may be used;

FIGS. 2–5 diagrammatically show various phases in one method of preparing the rope elements of the present invention;

FIGS. 6A and 6B are plan views showing how the rope elements may be assembled to make a pad;

FIG. 7 is a fragmentary top plan view showing the completed supporting structures using the pad of FIG. 6A;

FIG. 8 is a fragmentary sectional view of the supporting structure along the lines 8—8 of FIG. 7;

FIG. 9 diagrammatically illustrates another embodiment of this invention; and

FIG. 10 diagrammatically shows an alternative method for making the rope elements used herein.

Figure 1:
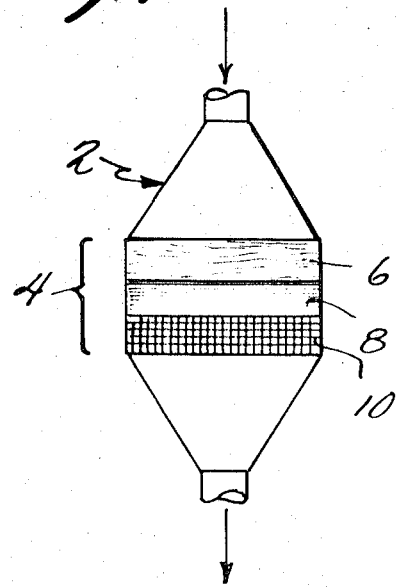

Referring more specifically to the drawings, a typical way of using a catalyst supporting structure according to this invention is shown in FIG. 1 wherein 2 represents a reactor which, for purposes of illustration, may be a conventional type ammonia oxidation burner, including a catalyst package 4, through which a gaseous mixture of $NH_3, O_2$ and $N_2$ is fed, at elevated temperature and pressure. The catalyst package 4 comprises a woven gauze or pack of such gauzes 6 of platinum metal, preferably platinum/rhodium alloy. Typically the gauze or gauze pack comprises woven 80 mesh screen with 90 percent platinum/10 percent alloy wire (0.003 inch) although different mesh sizes, wire compositions and the like may be used.

Preferably, but not necessarily, the catalyst package also comprises one or more screens 8 or the equivalent of a "getter" material, as described in U.S. Pat. No. 3,434,826. As shown, and as understood in the art, the getter is positioned just below the catalyst 6 and serves to collect platinum volatilized from the catalyst.

The supporting structure 10, constituting the essential aspect of the present invention, serves to support the catalyst 6 and getter 8 although it will be appreciated that in certain circumstances, the getter may be omitted. Additionally, in a further modification of the invention as described below, the getter may be made a part of the supporting structure 10.

Figure 2:
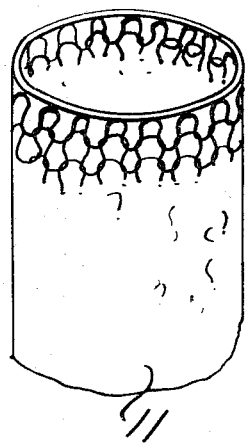
Figure 3:
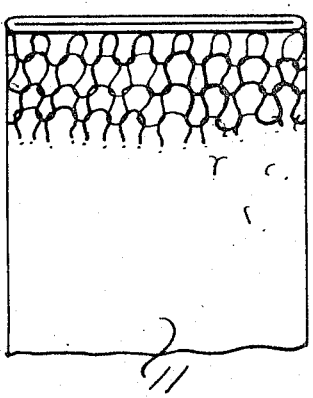
Figure 4:
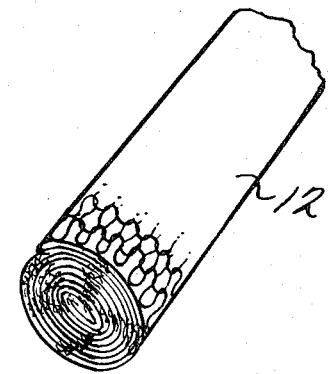
Figure 5:
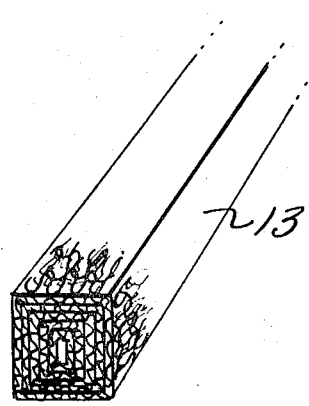

FIGS. 2-5 illustrate the steps involved in preparing the rope used for the supporting structure of this invention. The rope is formed from a tube 11 knitted of nichrome wire or the equivalent as shown in FIG. 2. Typically, but not necessarily, the tube is knitted by feeding 0.005 inch nichrome wire through a knitting machine to produce a knitted tube or cylinder, it being appreciated that the size of the wire used and the diameter of the tubing can be varied as described. The tube 11 is flattened as shown in FIG. 3 and rolled up as tightly as convenient around its longitudinal axis as in FIG. 4, to produce a cylinder 12, the latter being hereafter compacted and shaped in any convenient fashion, e.g., by drawing through a die, and calendaring to give the desired flat-sided rope 13, preferably of square cross-section, as shown in FIG. 5. The compacting and shaping of the knitted tubing results in a rope wherein the various layers of wire are intermeshed and integrated with each other to give a structure which does not tend to unwind or unravel.

The density of the knitted wire rope can be varied as desired to fit the intended use. However, the rope advantageously has a volume density of about 10-30 percent, preferably 10-20 percent (i.e., the degree of compacting is such that the rope comprises 10-30 percent or 10-20 percent metal, balance void). As noted earlier herein, the rope may be from ⅛- ½ inch in cross-sectional dimension, preferably ¼ inch square.

The pad 14, see FIGS. 6A and 6B particularly, is made by cutting the rope 13 into rope elements or pieces 16 of appropriate length to form the desired shape when the pieces are brought together in parallel contiguous relationship, preferably circular or hexagonal as shown in the embodiments illustrated in FIGS. 6A and B. One or more pieces 18 of the rope 13 are then placed around the abutting pieces 16 as shown in FIGS. 6A and 6B. Woven sheets 20 and 22 of nichrome wire as described earlier herein, are positioned on the top and bottom surfaces of the resulting pad 14, as shown in FIGS. 7 and 8, and spot welded on a grid pattern as shown at 24 (FIG. 7) to the encompassing rope piece or pieces 18 and to the elements 16 to complete the supporting structure. The sheets 20 and 22 extend outwardly over piece 18 as shown by the numeral 23 in FIG. 8 and serve to firmly hold the piece or pieces 18 and encircled elements 16 in place to give a compact unitary structure which is adapted for easy installation in conventional type ammonia oxidation reactors such as shown in FIG. 1, or the like, to provide a firm, controlled density base or support for the catalytic gauze.

In a further modification of the invention, the tube 11 used to make the wire rope 13 is knitted with a combination of nichrome wire and palladium or palladium/gold gold wire, e.g., the wires are plied together or otherwise combined so as to provide a catalyst support which includes the getter material as an integral part of the support itself rather than as a separate layer. This makes it possible to eliminate the use of the separate getter layer 8 shown in FIG. 1. FIG. 9 illustrates this embodiment of the invention, the numeral 25 representing the getter wire intermixed with the nichrome wire in the pad 14. It will be recognized that the amount of getter in the pad may be varied but, as an illustration, a ratio of palladium/gold alloy to nichrome wire of from 1:1 to 1:3 may be mentioned with best results obtainable at a 1:2 ratio. In lieu of the method described above for fabricating the pad 14, an alternative method is shown in FIG. 10. This method replaces the steps of cutting the rope into lengths 16 and encircling the same with rope 18 as in FIGS. 6A and 6B and involves using a continuous length 26 of the rope 13 and simply winding the rope on itself to provide the pad 14, the support being completed as in the FIG. 6A by placing the woven sheets 20 and 22 on both sides of the pad and welding as in FIG. 7.

While the invention has been described above with particular reference to use of a structure to support catalysts comprising platinum, e.g., platinum/rhodium alloys, for oxidation of ammonia in the production of nitric acid, it will be recognized that the structure may be used in other types of reactions, such as the Andrussow hydrocyanic acid synthesis, using the same or different catalysts. Similarly, while the use of nichrome wire has been referred to for use in making the present structures, other types of high heat-resistant material which can be made into wire and knit, may be used in lieu of, or in addition to, nichrome.

Various other modifications will also be apparent, the scope of the invention being defined in the following claims wherein:

What is claimed is:

1. A catalyst supporting structure comprising a layer of heat-resistant rope elements composed of knitted wire each of which is rolled up on itself and shaped into elements having essentially flat outer surfaces, said elements being placed in contiguous relationship with each other to provide a pad of substantially uniform thickness and having a flat top and bottom surfaces and a woven foraminous sheet of heat-resistant material bonded to each surface.

2. A catalyst supporting structure according to claim 1 wherein the sheets and the rope elements comprise nichrome wire.

3. A catalyst supporting structure according to claim 1 wherein the rope elements include a getter material for volatilized catalyst.

4. A structure according to claim 1 wherein said wire comprises stainless steel.

5. A catalyst supporting structure according to claim 1 wherein the rope elements are essentially square in cross-section.

6. A catalyst supporting structure according to claim 5 and comprising rope elements arranged in parallel in a common plane and of varying lengths so as to form a pad, another such element or elements peripherally encompassing said pad to enclose the elements arranged in parallel, and woven sheets of heat-resistant material on the top and bottom of said pad, said sheets being bonded to the pad at spaced intervals.

7. A method of making a structure according to claim 1 which comprises flattening a knitted wire tube, rolling the same into a cylinder and shaping the same to form a porous rope having flat sides, forming said rope into a flat-surfaced pad of essentially uniform thickness with adjacent elements of said rope in contiguous relationship and then bonding woven sheets of heat-resistant material to both surfaces of said pad.

8. The method of claim 7, wherein the pad is formed by cutting said rope into rope elements of desired length, placing said elements together in contiguous, relationship in a common plane to form said pad, peripherally encompassing said pad with at least one more of said rope elements, positioning the woven sheets on the surfaces of the pad and bonding the sheets at spaced intervals to said pad.

9. The method of claim 9 wherein the pad is formed by winding a continuous length of the rope upon itself to form a flat spiral pad of said rope.

\* \* \* \* \*